(12) United States Patent
Lin et al.

(10) Patent No.: US 8,614,680 B2
(45) Date of Patent: Dec. 24, 2013

(54) TOUCH SUBSTRATE AND TOUCH DISPLAY PANEL

(75) Inventors: Yu-Chuan Lin, Hsinchu County (TW); Chun-Chi Lai, Taipei (TW); Jing-Tin Kuo, Taipei (TW); Kuo-Hsing Cheng, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 878 days.

(21) Appl. No.: 12/725,463

(22) Filed: Mar. 17, 2010

(65) Prior Publication Data

US 2011/0090170 A1  Apr. 21, 2011

(30) Foreign Application Priority Data

Oct. 19, 2009  (TW) .............................. 98135268 A (51) Int. Cl.
  *G06F 3/041* (2006.01)
  *G06F 3/045* (2006.01)
  *G02F 1/1345* (2006.01)
  *H01L 23/495* (2006.01)

(52) U.S. Cl.
  USPC ............ 345/173; 345/175; 257/666; 349/152

(58) Field of Classification Search
  USPC ................................................. 345/173–175
  See application file for complete search history.

(56) References Cited

U.S. PATENT DOCUMENTS

| | | | |
|---|---|---|---|
| 6,879,367 B2 * | 4/2005 | Ukita ............................ | 349/149 |
| 7,012,664 B2 | 3/2006 | Moon et al. | |
| 7,271,871 B2 * | 9/2007 | Jen et al. ........................ | 349/152 |
| 7,714,815 B2 * | 5/2010 | Kim et al. ........................ | 345/82 |
| 2007/0080433 A1 * | 4/2007 | Lai ................................. | 257/666 |
| 2009/0184946 A1 * | 7/2009 | Ahn et al. ..................... | 345/206 |
| 2010/0066702 A1 * | 3/2010 | Lee et al. ....................... | 345/174 |

FOREIGN PATENT DOCUMENTS

| | | |
|---|---|---|
| TW | 200622455 | 7/2006 |
| TW | I277133 | 3/2007 |
| TW | 200714959 | 4/2007 |
| TW | I293178 | 2/2008 |
| TW | M364913 | 9/2009 |

OTHER PUBLICATIONS

"Office Action of Taiwan Counterpart Application", issued on Mar. 29, 2013, p1-p13, in which the listed references were cited.

* cited by examiner

*Primary Examiner* — Kenneth Bukowski
(74) *Attorney, Agent, or Firm* — Jianq Chyun IP Office (57) ABSTRACT

A touch substrate including a substrate, a plurality of first sensing series, a plurality of second sensing series, a plurality of signal pads, a plurality of signal transmission lines, and a plurality of conductive patterns is provided. The substrate has an active region and a peripheral region located outside the active region. The first and the second sensing series are disposed on the substrate and located in the active region. The signal pads are disposed on the substrate and located at the peripheral region. The signal transmission lines are disposed on the substrate and located in the peripheral region, and connect the first sensing series and the second sensing series to the corresponding signal pads. Each signal transmission line includes a winding portion disposed adjacent to one corresponding signal pad. Each conductive pattern is disposed on one signal pad and extends above the winding portion of one signal transmission line.

35 Claims, 5 Drawing Sheets

TOUCH SUBSTRATE AND TOUCH DISPLAY PANEL

CROSS-REFERENCE TO RELATED APPLICATION

This application claims the priority benefit of Taiwan application serial no. 98135268, filed on Oct. 19, 2009. The entirety of the above-mentioned patent application is hereby incorporated by reference herein and made a part of specification.

BACKGROUND OF THE INVENTION

1. Field of the Invention

The invention relates to a touch substrate and a touch display panel, and particularly relates to a touch substrate and a touch display panel adapted for different driving chips.

2. Description of Related Art

In recent years, touch panels have been extensively applied in various types of electronic appliances, such as GPS, PDA, cellular phone, and Hand-held PC, to replace traditional input devices (keyboards and mice, for instance). This design greatly improves the accessibility of the interfaces of electronic apparatuses. In addition, since the traditional input devices are no longer required, there is more space for installing display panels of larger size, which makes it rather convenient for users to browse data.

At present, touch panels are mainly categorized into two types: resistance type touch panel and capacitance type touch panel, in terms of driving manner and structural design. A capacitance type touch panel is characterized by multi-point touch sensing and thus becomes more and more popular. Generally speaking, the capacitance type touch panel includes a plurality of sensing series intersecting each other. Each of the sensing series is formed by connecting a plurality of sensing pads in series. In addition, the capacitance type touch panel utilizes a sensing chip for calculating the change of the capacitance of the sensing series, so as to obtain the position that is being touched.

However, as the design of the sensing chip changes, the signal transmission lines connecting the sensing series in the capacitance type touch panel must be altered accordingly. Since the sensing chip is designed based on the principle that the resistance of all the signal transmission lines is equal, the signal transmission lines need to have similar resistance. In addition, if the sensing chip is designed based on the principle that the capacitance between the signal transmission lines is equal, the signal transmission lines need to have similar capacitance therebetween. If the design of the signal transmission lines cannot meet the requirements of the sensing chip, the sensing accuracy of the capacitance type touch panel would be negatively affected.

SUMMARY OF THE INVENTION

The invention provides a touch substrate, including a plurality of signal transmission lines for connecting sensing series. The signal transmission lines have similar resistances, and the capacitances between adjacent signal transmission lines are approximately equal.

The invention provides a touch display panel, utilizing sensing chips of different design principles for driving and calculating touch sensing.

The invention provides a touch substrate, including a substrate, a plurality of first sensing series, a plurality of second sensing series, a plurality of signal pads, a plurality of signal transmission lines, and a plurality of conductive patterns. The substrate has an active region and a peripheral region that is located outside the active region. The first sensing series and the second sensing series are disposed on the substrate and located in the active region. The signal pads are disposed on the substrate and located in the peripheral region. The signal transmission lines are disposed on the substrate and located in the peripheral region to electrically connect the first sensing series and the second sensing series to the signal pads respectively. Each of the signal transmission lines includes a winding portion positioned adjacent to one of the signal pads. Each of the conductive patterns is disposed on one of the signal pads and extends above the winding portion of one of the signal transmission lines.

In an embodiment of the invention, the distances between any two adjacent signal transmission lines are substantially equal.

In an embodiment of the invention, the distances between any two adjacent conductive patterns are substantially equal.

In an embodiment of the invention, the touch substrate further includes an insulation layer disposed between the conductive patterns and the winding portion of each of the signal transmission lines.

In an embodiment of the invention, the winding portion of each of the signal transmission lines includes a plurality of first line segments and a plurality of second line segments. The first line segments and the second line segments are alternately connected in an end-to-end manner. Two ends of each of the first line segments are respectively connected with only one of the second line segments, and two ends of each of the second line segments are respectively connected with only one of the first line segments. In addition, the first line segments are parallel to an extending direction of the signal transmission lines, and the second line segments are parallel to a line-width direction of the signal transmission lines. For instance, the length of each of the first line segments is larger than the length of each of the second line segments. However, the length of each of the first line segments can be smaller than the length of each of the second line segments as well.

In an embodiment of the invention, each of the first sensing series and each of the second sensing series respectively include a plurality of sensing pads connected in series.

In an embodiment of the invention, the first sensing series extend along a first direction, and the second sensing series extend along a second direction.

In an embodiment of the invention, any two adjacent winding portions have different lengths, and the length of the longer winding portion is 1.2~1.5 times the length of the shorter winding portion.

In an embodiment of the invention, any two adjacent conductive patterns have different lengths, and the length of the longer conductive pattern outside the signal pad is 1.2~1.5 times the length of the shorter conductive pattern outside the signal pad.

In an embodiment of the invention, any two adjacent signal transmission lines have different wiring lengths, and a difference between the wiring lengths of the longer and the shorter signal transmission lines is substantially 5000 μm~7000 μm.

In an embodiment of the invention, the signal transmission lines are integrally formed.

In an embodiment of the invention, only one end of each of the conductive patterns is connected to the signal pad of one of the signal transmission lines.

The invention further provides a touch display panel, including a flat display panel, a plurality of first sensing series, a plurality of second sensing series, a plurality of signal pads, a plurality of signal transmission lines, and a plurality of conductive patterns. The flat display panel has an active region and a peripheral region that is located outside the active region. The first sensing series and the second sensing series are located in the active region. The signal pads are disposed in the peripheral region. The signal transmission lines are located in the peripheral region to electrically connect the first sensing series and the second sensing series to the signal pads respectively. Each of the signal transmission lines includes a winding portion positioned adjacent to one of the signal pads. Each of the conductive patterns is disposed on one of the signal pads and extends above the winding portion of one of the signal transmission lines.

In an embodiment of the invention, the distances between any two adjacent signal transmission lines are substantially equal.

In an embodiment of the invention, the distances between any two adjacent conductive patterns are substantially equal.

In an embodiment of the invention, the touch display panel further includes an insulation layer disposed between the conductive patterns and the winding portion of each of the signal transmission lines.

In an embodiment of the invention, the winding portion of each of the signal transmission lines includes a plurality of first line segments and a plurality of second line segments. The first line segments and the second line segments are alternately connected in an end-to-end manner. Moreover, the first line segments are parallel to an extending direction of the signal transmission lines, and the second line segments are parallel to a line-width direction of the signal transmission lines. The length of each of the first line segments is, for example, larger than the length of each of the second line segments. However, the length of each of the first line segments can be smaller than the length of each of the second line segments as well.

In an embodiment of the invention, each of the first sensing series and each of the second sensing series respectively include a plurality of sensing pads that are connected in series.

In an embodiment of the invention, the first sensing series extend along a first direction, and the second sensing series extend along a second direction.

In an embodiment of the invention, the flat display panel is a liquid crystal display panel, a plasma display panel, an electronic paper display panel, or an organic electro-luminescent display panel.

In an embodiment of the invention, the flat display panel includes a first substrate, a display medium, and a second substrate, wherein the display medium is disposed between the first substrate and the second substrate.

In an embodiment of the invention, the touch display panel further includes a substrate disposed on the flat display panel. The first sensing series, the second sensing series, the signal pads, and the signal transmission lines are disposed on the substrate. The touch display panel further includes an adhesive layer disposed between the substrate and the flat display panel to adhere the substrate to the flat display panel.

In an embodiment of the invention, any two adjacent winding portions have different lengths, and the length of the longer winding portion is 1.2~1.5 times the length of the shorter winding portion.

In an embodiment of the invention, any two adjacent conductive patterns have different lengths, and the length of the longer conductive pattern outside the signal pad is 1.2~1.5 times the length of the shorter conductive pattern outside the signal pad.

In an embodiment of the invention, any two adjacent signal transmission lines have different wiring lengths, and a difference between the wiring lengths of the longer and the shorter signal transmission lines is substantially 5000 µm~7000 µm.

In an embodiment of the invention, the signal transmission lines are integrally formed.

In an embodiment of the invention, only one end of each of the conductive patterns is connected to the signal pad of one of the signal transmission lines.

According to the above descriptions of the invention, the signal transmission lines have winding portions on which conductive patterns are disposed for adjusting the electric properties between the signal transmission lines. To be specific, the invention utilizes the design of the winding portions to adjust the resistance of the signal transmission lines and utilizes the conductive patterns, which are electrically connected to the signal pads, to vary the capacitance between the signal transmission lines. Because of the design of the signal transmission lines and the conductive patterns, the touch substrate and the touch display panel can meet the requirements of different sensing chips. In other words, the application of the touch substrate and the touch display panel of the invention is more extensive.

In order to make the aforementioned and other features and advantages of the invention more comprehensible, several embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
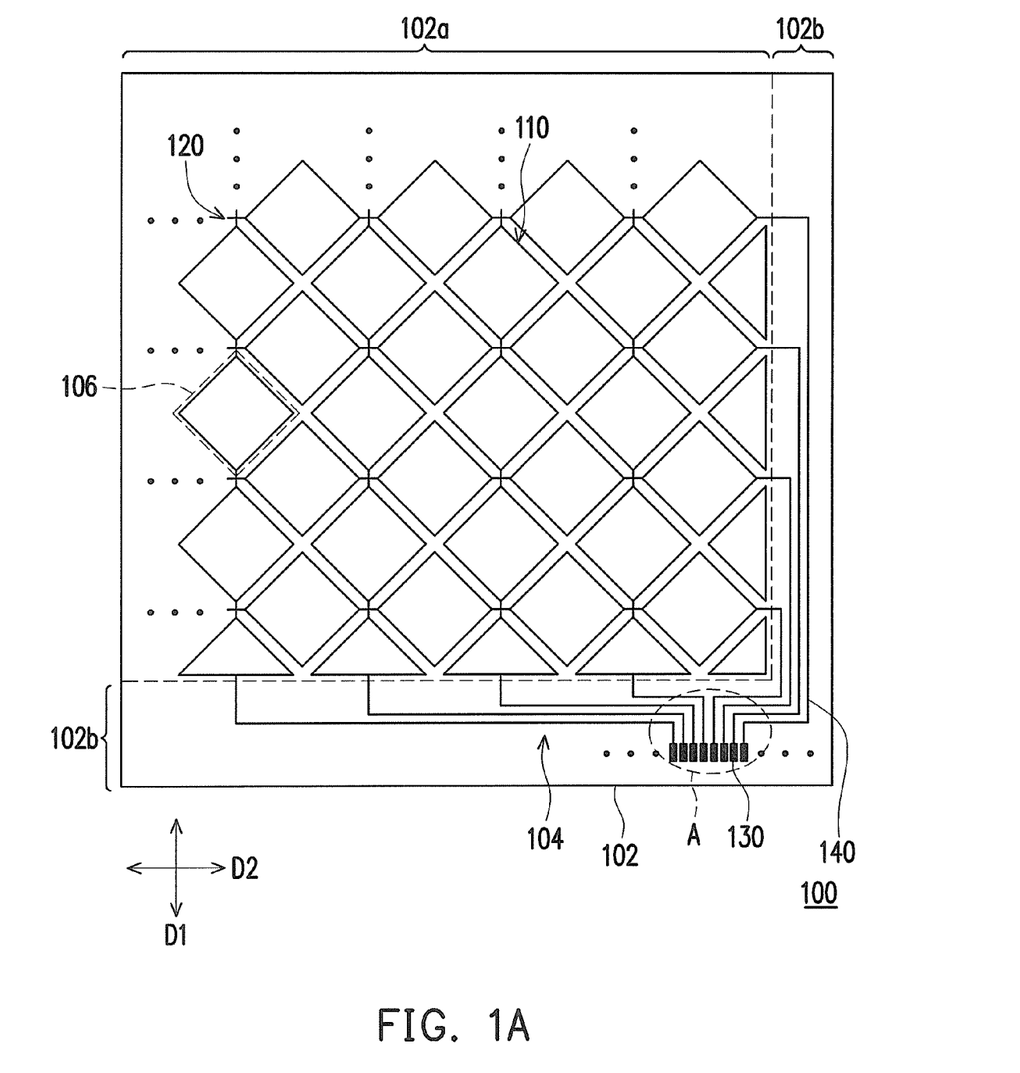
FIG. 1A is a schematic top view of a touch substrate according to one embodiment of the invention.
Figure 1B:
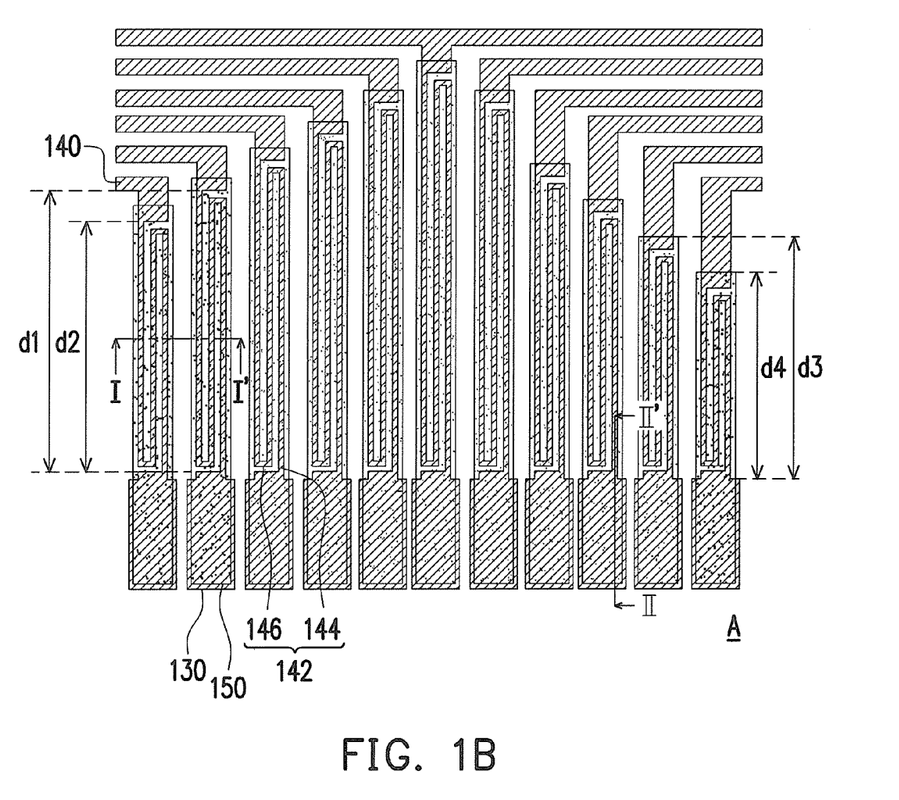
FIG. 1B is an enlarged view of an area A in FIG. 1A.
Figure 1C:
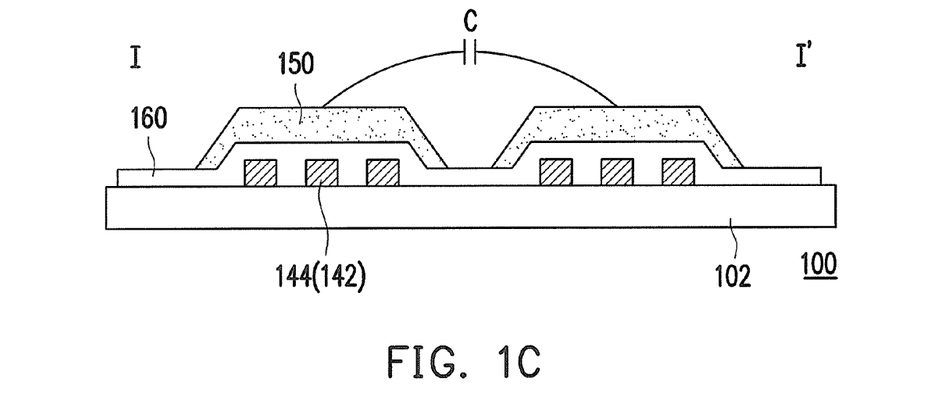
FIG. 1C is a schematic cross-sectional view along Line I-I' in FIG. 1B.
Figure 1D:
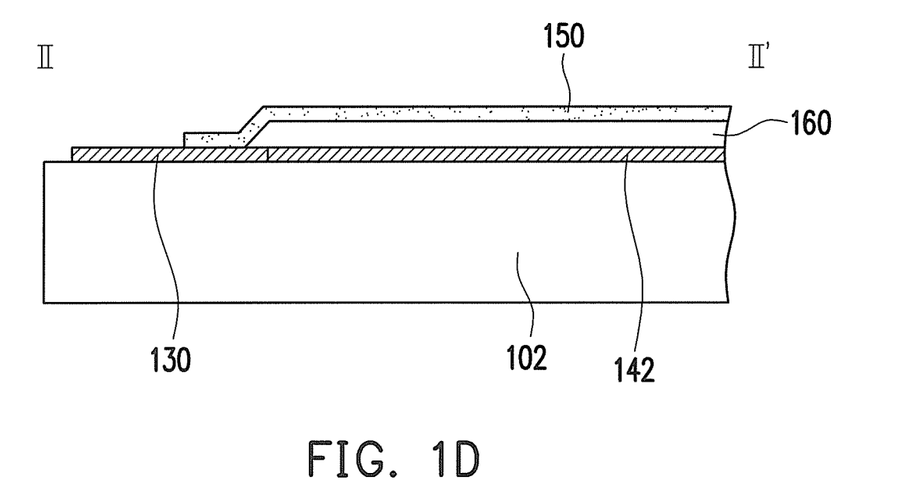
FIG. 1D is a schematic cross-sectional view along Line II-II' in FIG. 1B.

FIG. 1A is a schematic top view of a touch substrate according to one embodiment of the invention; FIG. 1B is an enlarged view of an area A in FIG. 1A; FIG. 1C is a schematic cross-sectional view along Line I-I' in FIG. 1B; and FIG. 1D is a schematic cross-sectional view along Line II-II' in FIG. 1B. With reference to FIGS. 1A and 1B, a touch substrate 100 includes a substrate 102 and a touch device 104 disposed on the substrate 102. The substrate 102 has an active region 102a and a peripheral region 102b that is located outside the active region 102a. The touch device 104 includes a plurality of first sensing series 110, a plurality of second sensing series 120, a plurality of signal pads 130, a plurality of signal transmission lines 140, and a plurality of conductive patterns 150.

The first sensing series 110 and the second sensing series 120 are located in the active region 102a. The signal pads 130 are located in the peripheral region 102b. The signal transmission lines 140 are located in the peripheral region 102b to electrically connect the first sensing series 110 and the second sensing series 120 to the signal pads 130 respectively. Each of the signal transmission lines 140 includes a winding portion 142, and the winding portion 142 is positioned adjacent to the corresponding signal pad 130. Each of the conductive patterns 150 is disposed on one of the signal pads 130 and extends above the winding portion 142 of one of the signal transmission lines 140. The conductive patterns 150 are, for example, formed by a transparent conductive material, which includes indium tin oxide, indium zinc oxide, and so forth.

Specifically, each of the first sensing series 110 and each of the second sensing series 120 respectively include a plurality of sensing pads 106 that are connected in series. The first sensing series 110 extend along a first direction D1, and the second sensing series 120 extend along a second direction D2, for instance. The first direction D1 and the second direction D2 intersect each other, so that the first sensing series 110 and the second sensing series 120 constitute a two-dimensional touch sensing network.

A sensing chip (not shown) used in the touch substrate 100 is capable of calculating the sensing signals from the touch sensing network and thereby obtaining a touch position. During calculation, some parameters need to be determined, so that the sensing chip can accurately calculate the position that is being touched. For instance, some sensing chips require the resistance of the signal transmission lines 140 to be equal or as similar as possible. Some other sensing chips require the signal transmission lines 140 to have approximately the same capacitance. If the design of the touch substrate 100 cannot meet the requirements of the sensing chips, the touch substrate 100 would not function properly.

However, the distances between the first sensing series 110 and the signal pads 130 are different from one another. Moreover, the distances between the second sensing series 120 and the signal pads 130 are different from one another as well. Therefore, any two adjacent signal transmission lines 140 have different wiring lengths. According to this embodiment, a difference between the wiring lengths of two adjacent signal transmission lines 140 (one is longer and the other is shorter) is substantially 5000 μm~7000 μm. For this reason, the resistance of the signal transmission lines 140 may vary due to the different wiring lengths.

To reduce the resistance discrepancy caused by different wiring lengths, each of the signal transmission lines 140 in the touch substrate 100 of this embodiment further includes a winding portion 142. The winding portion 142 is formed by winding line segments. The resistance of the signal transmission lines 140 is adjusted by the winding portion 142 to be approximate to each other. In other words, the touch substrate 100 of this embodiment can satisfy the requirement that the signal transmission lines 140 need to have the same resistance. In addition, the signal transmission lines 140 are integrally formed, for example. That is, the winding portions 142 and other parts of the signal transmission lines 140 are formed by the same fabricating process with the same material. The signal transmission lines 140 and the signal pads 130 are formed by the same fabricating process with the same material as well.

More specifically, the winding portion 142 includes a plurality of first line segments 144 and a plurality of second line segments 146. The first line segments 144 and the second line segments 146 are alternately connected in an end-to-end manner. Two ends of each of the first line segments 144 are respectively connected to only one of the second line segments 146, and two ends of each of the second line segments 146 are respectively connected to only one of the first line segments 144. As shown in FIG. 1B, the first line segments 144 are parallel to an extending direction of the signal transmission lines 140, and the second line segments 146 are parallel to a line-width direction of the signal transmission lines 140. In this embodiment, the length of each of the first line segments 144 is greater than the length of each of the second line segments 146.

The design of the winding portion 142 increases the resistance of the signal transmission lines 140. Moreover, a line width of the line segment 144 or the line segment 146 is narrowed, which further increases the resistance. Generally speaking, the signal transmission lines 140 that have shorter wiring lengths should be properly designed to have higher resistance, so that all the signal transmission lines 140 can have approximately equal resistance. Since the wiring lengths are different, any two adjacent winding portions 142 have different lengths accordingly. In an embodiment, when comparing two adjacent winding portions 142, the length of the longer winding portion 142 is 1.2~1.5 times the length of the shorter winding portion 142. With reference to FIG. 1B, the length of d1 is approximately 1.2~1.5 times the length of d2. Consequently, the resistance discrepancy of the signal transmission lines 140, caused by different wiring lengths, is decreased. In other words, the signal transmission lines 140 have approximately the same resistance.

However, since the winding portion 142 is constituted by several line segments, the capacitance effect between adjacent signal transmission lines 140 becomes complex. Considering the above, in this embodiment, the conductive patterns 150 are disposed on the winding portions 142, and each of the conductive patterns 150 is directly disposed on one of the signal pads 130. Then, referring to FIGS. 1A~1C, the touch substrate 100 further includes an insulation layer 160 disposed between the conductive patterns 150 and the winding portion 142 of each of the signal transmission lines 140. Moreover, referring to FIG. 1D, each of the conductive patterns 150 has only one end in contact with the signal pad 130 of one of the signal transmission lines 140. Therefore, each of the conductive patterns 150 is serially connected with one corresponding winding portion 142. Based on the above, the capacitance effect between adjacent signal transmission lines 140 is, for example, formed by adjacent conductive patterns 150, which simplifies the design.

According to this embodiment, the distances between any two adjacent signal transmission lines 140 are substantially equal, and the distances between any two adjacent conductive patterns 150 are substantially equal. As a result, a capacitance C formed between adjacent signal transmission lines 140 is approximately the same. To be more specific, any two adjacent conductive patterns 150 have different lengths. When comparing two adjacent conductive patterns 150, the length of the longer conductive pattern 150 outside the signal pad 130 is 1.2~1.5 times the length of the shorter conductive pattern 150 outside the signal pad 130. That is, in FIG. 1B, the length of d3 is approximately 1.2~1.5 times the length of d4. Accordingly, the conductive patterns 150 can at least fully cover the winding portions 142. Because of this design, the touch substrate 100 of this embodiment can satisfy the requirement that the resistance of the signal transmission lines 140 needs to be consistent and the requirement that the capacitances form between two adjacent the signal transmission lines 140 need to be approximately equal. Hence, the touch substrate 100 described in this embodiment can be coordinated with sensing chips of different designs and have higher applicability.

Figure 2:
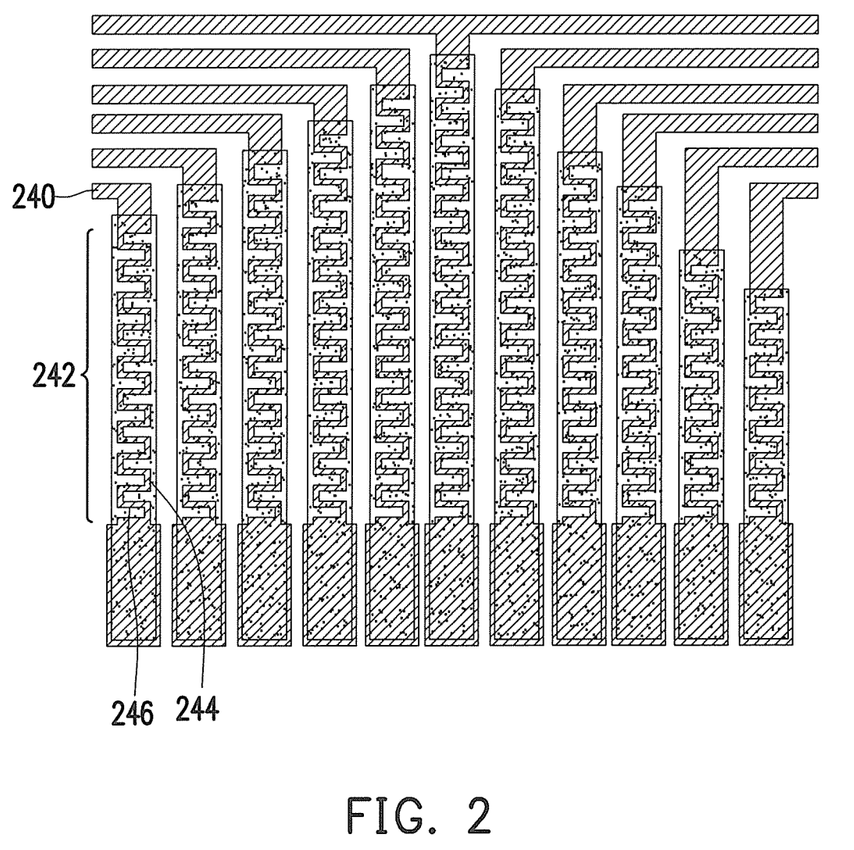
FIG. 2 illustrates signal transmission lines according to another embodiment of the invention.

FIG. 2 illustrates signal transmission lines according to another embodiment of the invention. With reference to FIG. 2, a difference between signal transmission lines 240 and the aforementioned signal transmission lines 140 lies in the design of a winding portion 242. In the winding portion 242 described in this embodiment, the length of a first line segment 244 is smaller than the length of a second line segment 246. In other words, the wiring methods of the winding portion 242 and the winding portion 142 are different. Both of the wiring methods can be utilized to adjust the resistance of signal transmission lines 240. Therefore, in some other embodiments of the invention, the two wiring methods can be simultaneously carried out on one signal transmission line 240 or respectively used on different signal transmission lines 240. In addition, in other embodiments, the length of the first line segment 244 is equal to the length of the second line segment 246.

Figure 3A:
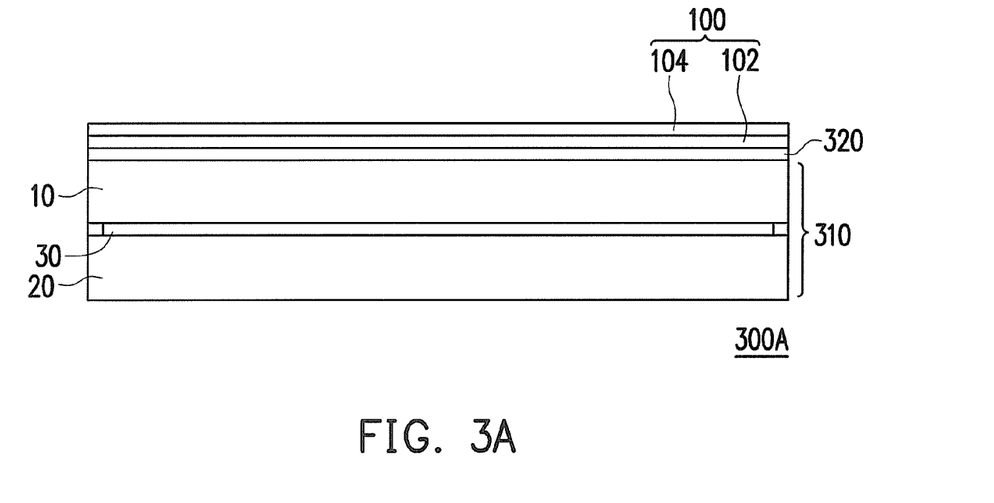
FIGS. 3A and 3B depict two types of touch display panels according to one embodiment of the invention.
Figure 3B:
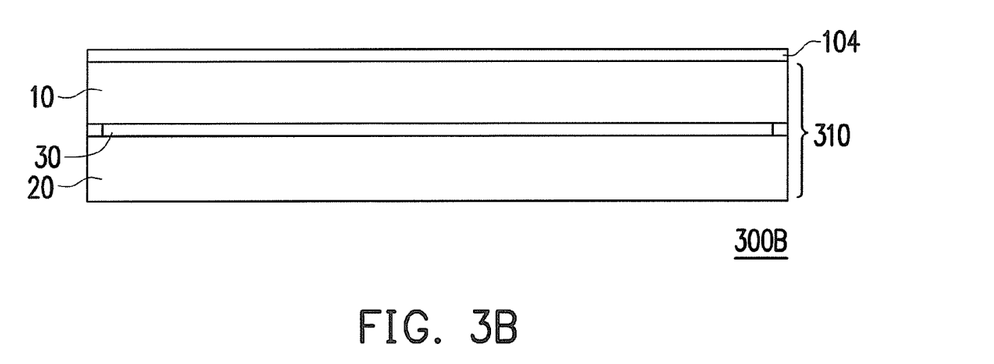

FIGS. 3A and 3B depict two types of touch display panels according to an embodiment of the invention. With reference to FIG. 3A first, a touch display panel 300A includes a flat display panel 310 and the aforementioned touch substrate 100. The flat display panel 310 includes a first substrate 10, a second substrate 20, and a display medium 30 disposed between the first substrate 10 and the second substrate 20. The flat display panel 310 is, for example, a liquid crystal display panel, a plasma display panel, an electronic paper display panel, or an organic electro-luminescent display panel. Moreover, the touch substrate 100 is adhered onto the first substrate 10 of the flat display panel 310 by an adhesive layer 320. This design integrates the touch device 104 with the flat display panel 310. Since the touch substrate 100 can meet the requirements of different sensing chips, the touch display panel 300A has higher applicability.

With reference to FIG. 3B, in addition to integrating the touch substrate 100 with the flat display panel 310 by adhesion, the touch device 104 can be directly disposed on the first substrate 10 of the flat display panel 310 in this embodiment. That is, the first sensing series 110, the second sensing series 120, the signal pads 130, and the signal transmission lines 140 as shown in FIG. 1A can be directly disposed on the flat display panel 310 to form a touch display panel 300B. More specifically, a substrate 102, as depicted in FIG. 1A, can be an individual plate or one of the plates of the flat display panel 310. If the substrate 102 is one of the plates in the flat display panel 310, the touch device 104 is directly fabricated on the flat display panel 310, which is the design of the touch display panel 300B. When the touch device 104 is fabricated directly on the flat display panel 310, the inconvenience brought by the adhesion process can be avoided, and the thickness of the whole apparatus can be further reduced.

To sum up, the invention disposes winding portions in the signal transmission lines, which connect the sensing series, to adjust the resistance of the signal transmission lines. In addition, the invention covers the winding portions of the signal transmission lines with conductive patterns, which are separated by a certain distance. Consequently, the signal transmission lines have approximately the same resistance and have equal capacitance therebetween. Based on the above, the touch substrate and the touch display panel of the invention are adapted for sensing chips of different designs. In other words, the touch substrate and the touch display panel of the invention are not limited to use with certain types of sensing chips and have higher applicability.

Although the invention has been described with reference to the above embodiments, it is apparent to one of ordinary skill in the art that modifications to the described embodiments may be made without departing from the spirit of the invention. Accordingly, the scope of the invention is defined by the attached claims not by the above detailed descriptions.

What is claimed is:

1. A touch substrate, comprising:
    a substrate having an active region and a peripheral region located outside the active region;
    a plurality of first sensing series disposed on the substrate and located in the active region;
    a plurality of second sensing series disposed on the substrate and located in the active region;
    a plurality of signal pads disposed on the substrate and located in the peripheral region;
    a plurality of signal transmission lines disposed on the substrate and located in the peripheral region to electrically connect the first sensing series and the second sensing series to the signal pads respectively, wherein each of the signal transmission lines comprises a winding portion positioned adjacent to one of the signal pads; and
    a plurality of conductive patterns, wherein each of the conductive patterns is directly disposed on one of the signal pads and extends above the winding portion of one of the signal transmission lines such that the each of the conductive patterns covers an area of the winding portion of the one of the signal transmission lines.

2. The touch substrate as claimed in claim 1, wherein the distances between any two adjacent signal transmission lines are substantially equal.

3. The touch substrate as claimed in claim 1, wherein the distances between any two adjacent conductive patterns are substantially equal.

4. The touch substrate as claimed in claim 1, further comprising an insulation layer disposed between the conductive patterns and the winding portion of each of the signal transmission lines.

5. The touch substrate as claimed in claim 1, wherein the winding portion of each of the signal transmission lines comprises a plurality of first line segments and a plurality of second line segments alternately connected in an end-to-end manner, two ends of each of the first line segments are respectively connected to only one of the second line segments, two ends of each of the second line segments are respectively connected to only one of the first line segments, the first line segments are parallel to an extending direction of the signal transmission lines, and the second line segments are parallel to a line-width direction of the signal transmission lines.

6. The touch substrate as claimed in claim 5, wherein the length of each of the first line segments is greater than the length of each of the second line segments.

7. The touch substrate as claimed in claim 5, wherein the length of each of the first line segments is smaller than the length of each of the second line segments.

8. The touch substrate as claimed in claim 1, wherein each of the first sensing series and each of the second sensing series respectively comprise a plurality of sensing pads connected in series.

9. The touch substrate as claimed in claim 1, wherein each of the first sensing series extends along a first direction and each of the second sensing series extends along a second direction.

10. The touch substrate as claimed in claim 1, wherein any two adjacent winding portions have different lengths, and the length of the longer winding portion is 1.2~1.5 times the length of the shorter winding portion.

11. The touch substrate as claimed in claim 1, wherein any two adjacent conductive patterns have different lengths, and the length of the longer conductive pattern outside the signal pad is 1.2~1.5 times the length of the shorter conductive pattern outside the signal pad.

12. The touch substrate as claimed in claim 1, wherein any two adjacent signal transmission lines have different wiring lengths, and a difference between the wiring lengths of the longer and the shorter signal transmission lines is substantially 5000 μm~7000 μm.

13. The touch substrate as claimed in claim 1, wherein the signal transmission lines are integrally formed.

14. The touch substrate as claimed in claim 1, wherein only one end of each of the conductive patterns is in contact with the signal pad of one of the signal transmission lines.

15. A touch display panel, comprising:
   a flat display panel having an active region and a peripheral region located outside the active region;
   a plurality of first sensing series located in the active region; a plurality of second sensing series located in the active region; a plurality of signal pads located in the peripheral region;
   a plurality of signal transmission lines located in the peripheral region to electrically connect the first sensing series and the second sensing series to the signal pads respectively, wherein each of the signal transmission lines comprises a winding portion positioned adjacent to one of the signal pads; and
   a plurality of conductive patterns, wherein each of the conductive patterns is directly disposed on one of the signal pads and extends above the winding portion of one of the signal transmission lines such that the each of the conductive patterns covers an area of the winding portion of the one of the signal transmission lines.

16. The touch display panel as claimed in claim 15, wherein the distances between any two adjacent signal transmission lines are substantially equal.

17. The touch display panel as claimed in claim 15, wherein the distances between any two adjacent conductive patterns are substantially equal.

18. The touch display panel as claimed in claim 15, further comprising an insulation layer disposed between the conductive patterns and the winding portion of each of the signal transmission lines.

19. The touch display panel as claimed in claim 15, wherein the winding portion of each of the signal transmission lines comprises a plurality of first line segments and a plurality of second line segments alternately connected in an end-to-end manner, the first line segments are parallel to an extending direction of the signal transmission lines, and the second line segments are parallel to a line-width direction of the signal transmission lines.

20. The touch display panel as claimed in claim 19, wherein the length of each of the first line segments is greater than the length of each of the second line segments.

21. The touch display panel as claimed in claim 19, wherein the length of each of the first line segments is smaller than the length of each of the second line segments.

22. The touch display panel as claimed in claim 15, wherein each of the first sensing series and each of the second sensing series respectively comprise a plurality of sensing pads connected in series.

23. The touch display panel as claimed in claim 15, wherein each of the first sensing series extends along a first direction and each of the second sensing series extends along a second direction.

24. The touch display panel as claimed in claim 15, wherein the flat display panel is a liquid crystal display panel, a plasma display panel, an electronic paper display panel, or an organic electro-luminescent display panel.

25. The touch display panel as claimed in claim 15, wherein the flat display panel comprises a first substrate, a display medium, and a second substrate; the display medium is disposed between the first substrate and the second substrate.

26. The touch display panel as claimed in claim 15, further comprising a substrate disposed on the flat display panel, wherein the first sensing series, the second sensing series, the signal pads, and the signal transmission lines are disposed on the substrate.

27. The touch display panel as claimed in claim 26, further comprising an adhesive layer disposed between the substrate and the flat display panel to adhere the substrate onto the flat display panel.

28. The touch display panel as claimed in claim 15, wherein any two adjacent winding portions have different lengths, and the length of the longer winding portion is 1.2~1.5 times the length of the shorter winding portion.

29. The touch display panel as claimed in claim 15, wherein any two adjacent conductive patterns have different lengths, and the length of the longer conductive pattern outside the signal pad is 1.2~1.5 times the length of the shorter conductive pattern outside the signal pad.

30. The touch display panel as claimed in claim 15, wherein any two adjacent signal transmission lines have different wiring lengths, and a difference between the wiring lengths of the longer and the shorter signal transmission lines is substantially 5000 μm~7000 μm.

31. The touch display panel as claimed in claim 15, wherein the signal transmission lines are integrally formed.

32. The touch display panel as claimed in claim 15, wherein only one end of each of the conductive patterns is in contact with the signal pad of one of the signal transmission lines.

33. A touch substrate, comprising:
   a substrate having an active region and a peripheral region located outside the active region;
   a plurality of first sensing series disposed on the substrate and located in the active region;
   a plurality of second sensing series disposed on the substrate and located in the active region;
   a plurality of signal pads disposed on the substrate and located in the peripheral region;
   a plurality of signal transmission lines disposed on the substrate and located in the peripheral region to electrically connect the first sensing series and the second sensing series to the signal pads respectively, wherein each of the signal transmission lines comprises a winding portion positioned adjacent to one of the signal pads; and
   a plurality of conductive patterns, wherein each of the conductive patterns is directly disposed on one of the signal pads and extends over a top of the winding portion of one of the signal transmission lines.

34. A touch substrate, comprising:
   a substrate having an active region and a peripheral region located outside the active region;
   a plurality of first sensing series disposed on the substrate and located in the active region;
   a plurality of second sensing series disposed on the substrate and located in the active region;
   a plurality of signal pads disposed on the substrate and located in the peripheral region;
   a plurality of signal transmission lines disposed on the substrate and located in the peripheral region to electrically connect the first sensing series and the second sensing series to the signal pads respectively, wherein each of the signal transmission lines comprises a winding portion positioned adjacent to one of the signal pads;

and a plurality of conductive patterns, wherein each of the conductive patterns is directly disposed on one of the signal pads in the peripheral region and extends directly above the winding portion of one of the signal transmission lines in the peripheral region.

35. A touch substrate, comprising:

a substrate having an active region and a peripheral region located outside the active region;

a plurality of first sensing series disposed on the substrate and located in the active region;

a plurality of second sensing series disposed on the substrate and located in the active region;

a plurality of signal pads disposed on the substrate and located in the peripheral region;

a plurality of signal transmission lines disposed on the substrate and located in the peripheral region to electrically connect the first sensing series and the second sensing series to the signal pads respectively, wherein each of the signal transmission lines comprises a winding portion positioned adjacent to one of the signal pads; and a plurality of conductive patterns, wherein each of the conductive patterns is directly disposed on one of the signal pads, located outside the active region, wherein in the peripheral region, the winding portion of the one of the signal transmission lines is located within an area of one of the conductive patterns.

* * * * *